US011904492B2

(12) United States Patent
Lee

(10) Patent No.: US 11,904,492 B2
(45) Date of Patent: Feb. 20, 2024

(54) STRIP CUTTING DEVICE FOR DIAGNOSTIC KIT

(71) Applicants: Seokhyun Lee, Seoul (KR); Wonha Lee, Seoul (KR)

(72) Inventor: Seok Hyun Lee, Seoul (KR)

(73) Assignees: Seokhyun Lee, Seoul (KR); Wonha Lee, Seoul (KR)

( * ) Notice: Subject to any disclaimer, the term of this patent is extended or adjusted under 35 U.S.C. 154(b) by 0 days.

(21) Appl. No.: 17/792,188

(22) PCT Filed: May 27, 2021

(86) PCT No.: PCT/KR2021/006573

§ 371 (c)(1),
(2) Date: Jul. 12, 2022

(87) PCT Pub. No.: WO2021/246710

PCT Pub. Date: Dec. 9, 2021

(65) Prior Publication Data

US 2023/0051576 A1 Feb. 16, 2023

(30) Foreign Application Priority Data

Jun. 5, 2020 (KR) ........................ 10-2020-0068303

(51) Int. Cl.
*B26D 7/26* (2006.01)
*B26D 1/24* (2006.01)

(52) U.S. Cl.
CPC ........... *B26D 7/2635* (2013.01); *B26D 1/245* (2013.01)

(58) Field of Classification Search
CPC .............................. B26D 7/2635; B26D 1/245
See application file for complete search history.

(56) References Cited

U.S. PATENT DOCUMENTS

| | | | | | |
|---|---|---|---|---|---|
| 469,543 | A * | 2/1892 | Cook | B27B 5/34 | 83/482 |
| 1,662,871 | A * | 3/1928 | Swift, Jr. | B26D 7/2635 | 144/1.1 |
| 2,142,799 | A * | 1/1939 | Nicholas | B23D 19/065 | 83/333 |
| 3,122,958 | A * | 3/1964 | Washburn | B26D 1/0006 | 83/676 |

(Continued)

*Primary Examiner* — Sean M Michalski
(74) *Attorney, Agent, or Firm* — LEX IP MEISTER, PLLC

(57) ABSTRACT

The present invention is configured such that an adjustment nut for fixing spacers and blades repeatedly fitted to a shaft is provided with at least two concentricity adjustment screws, and, with the spacers and the blades fixed by the adjustment nut, the spacers and the blades are pushed by the concentricity adjustment screws in the direction of the shaft to enable concentricity adjustment, and thus, without causing defects, the blades are protected and can be used for a long time. In particular, according to the present invention, while one side shaft with respect to a diagnostic sheet is elastically supported, position adjustment in the longitudinal direction thereof is possible, and also projections are formed on the peripheries of the surfaces of the spacers facing the cutting edges of the blades thus to provide extra spaces for the blades in which the blades move, thereby preventing the deformation of cut strips and the damages on the blades.

4 Claims, 8 Drawing Sheets

(56) References Cited

U.S. PATENT DOCUMENTS

| | | | | | |
|---|---|---|---|---|---|
| 3,606,811 | A * | 9/1971 | Hallden | B23D 25/12 83/342 |
| 4,428,265 | A * | 1/1984 | Bolton | B26D 7/2635 83/504 |
| 4,885,964 | A * | 12/1989 | Nielsen | B26D 7/2635 83/504 |
| 4,899,630 | A * | 2/1990 | Shioya | B26D 1/245 83/504 |
| 5,067,380 | A * | 11/1991 | Seefeldt | B23D 35/008 83/505 |
| 5,924,347 | A * | 7/1999 | Soderlund | B23D 35/007 83/698.41 |
| 6,631,663 | B1 * | 10/2003 | Hutzenlaub | B65H 35/02 83/698.41 |
| 7,146,893 | B2 * | 12/2006 | Aichele | B26D 7/2614 83/698.61 |
| D808,450 | S * | 1/2018 | Woodroof | B26F 1/20 D15/139 |
| 10,682,783 | B2 * | 6/2020 | Yang | B26D 3/12 |
| 2005/0217447 | A1 * | 10/2005 | Hollandsworth | B26D 7/2635 83/508.3 |
| 2010/0080974 | A1 * | 4/2010 | Nagao | G03C 11/00 83/56 |
| 2012/0240741 | A1 * | 9/2012 | Sanchez | B26D 1/245 83/508.3 |
| 2014/0240696 | A1 * | 8/2014 | Daul | B26D 1/245 356/72 |
| 2017/0368709 | A1 * | 12/2017 | Yang | B26D 7/2621 |
| 2018/0200908 | A1 * | 7/2018 | Orzel | B26D 7/2635 |
| 2020/0238554 | A1 * | 7/2020 | Barrer | B26D 7/2635 |

* cited by examiner

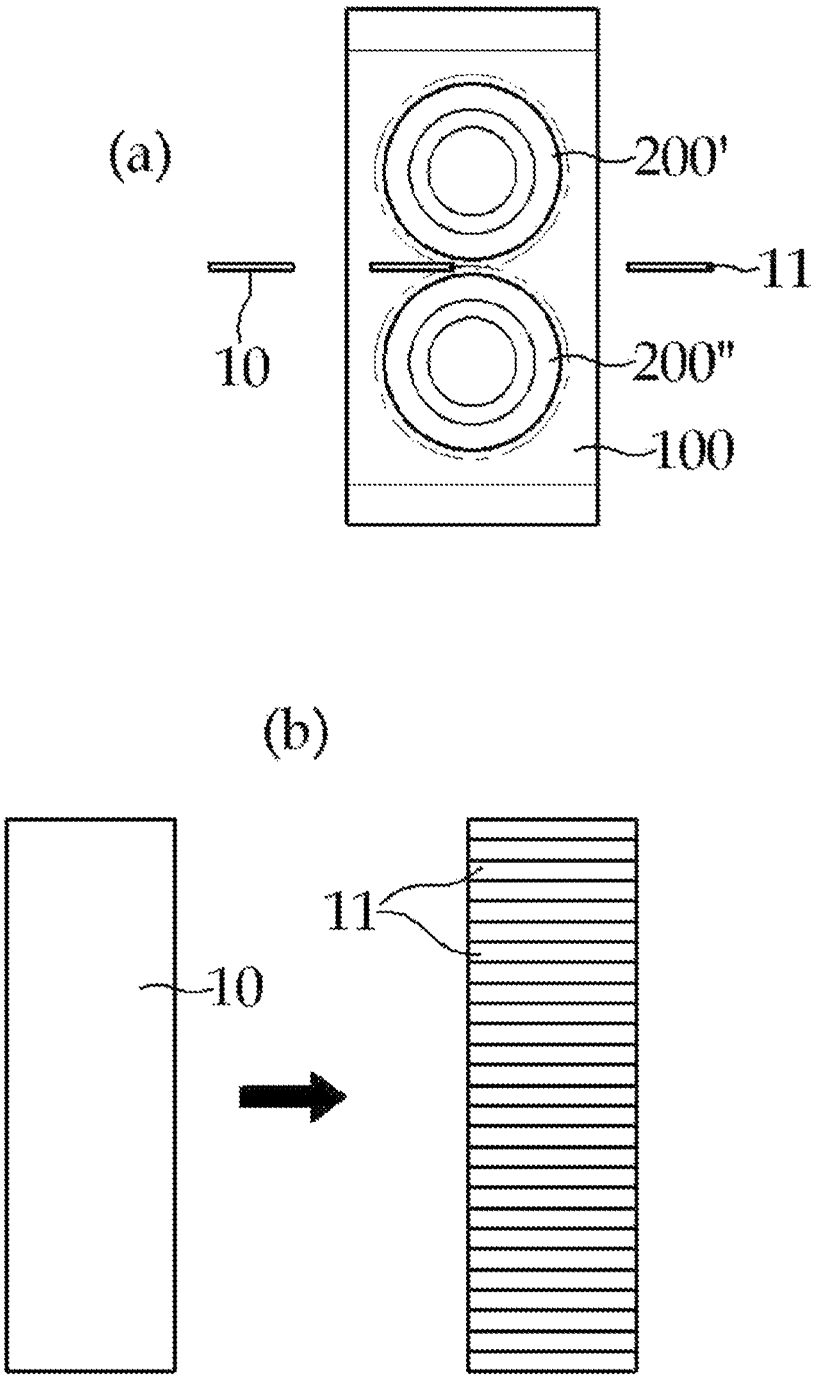
[FIG 1]

[FIG 2]
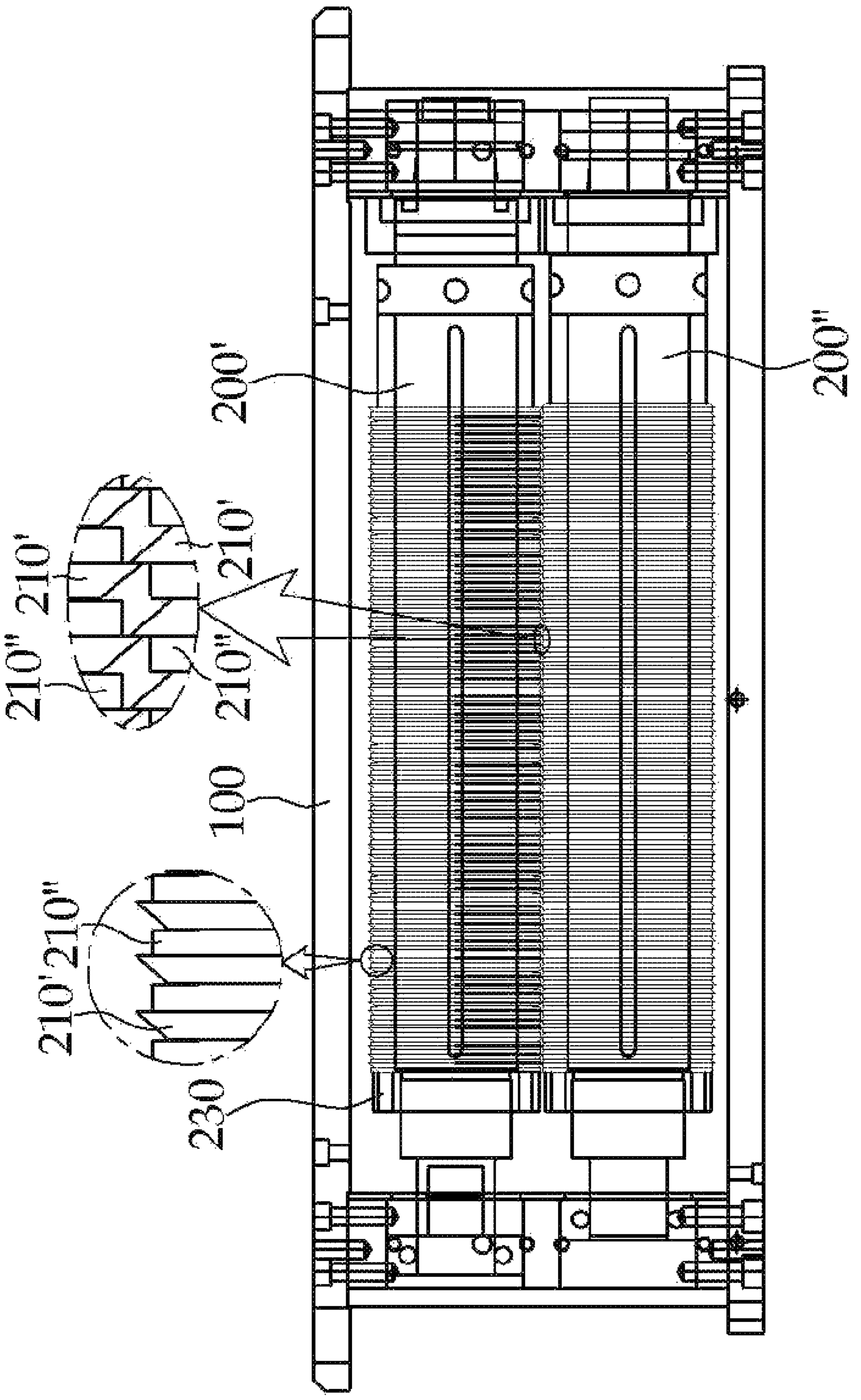

[FIG 3]
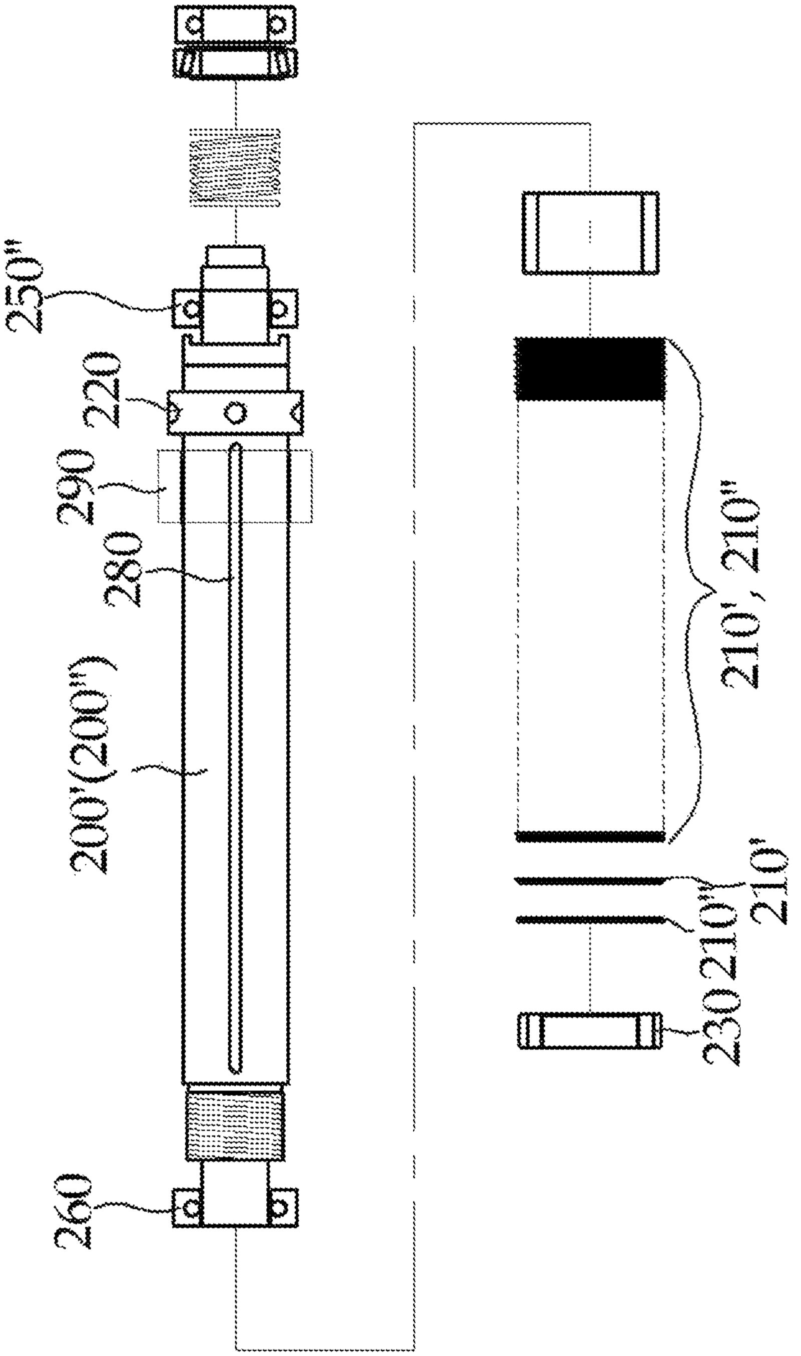

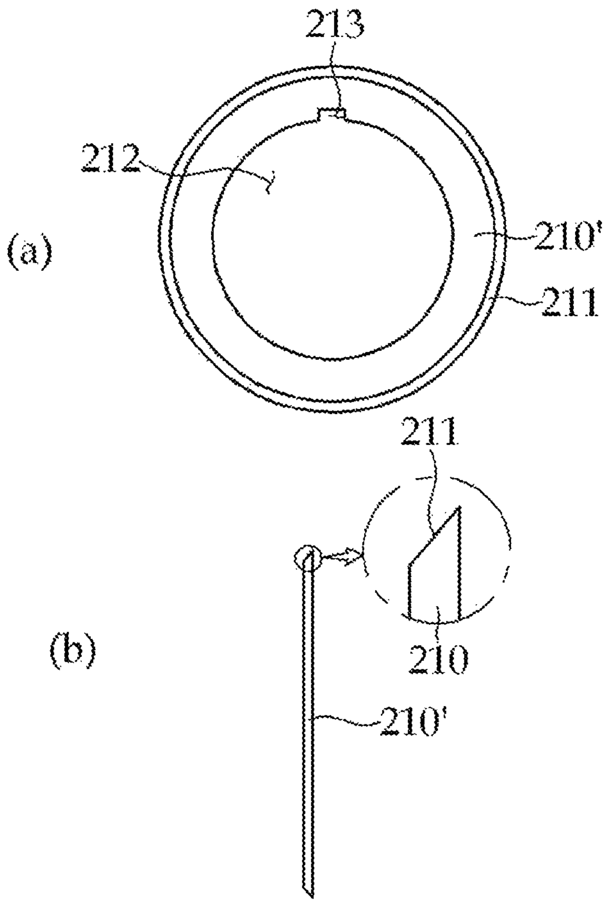
[FIG 4]

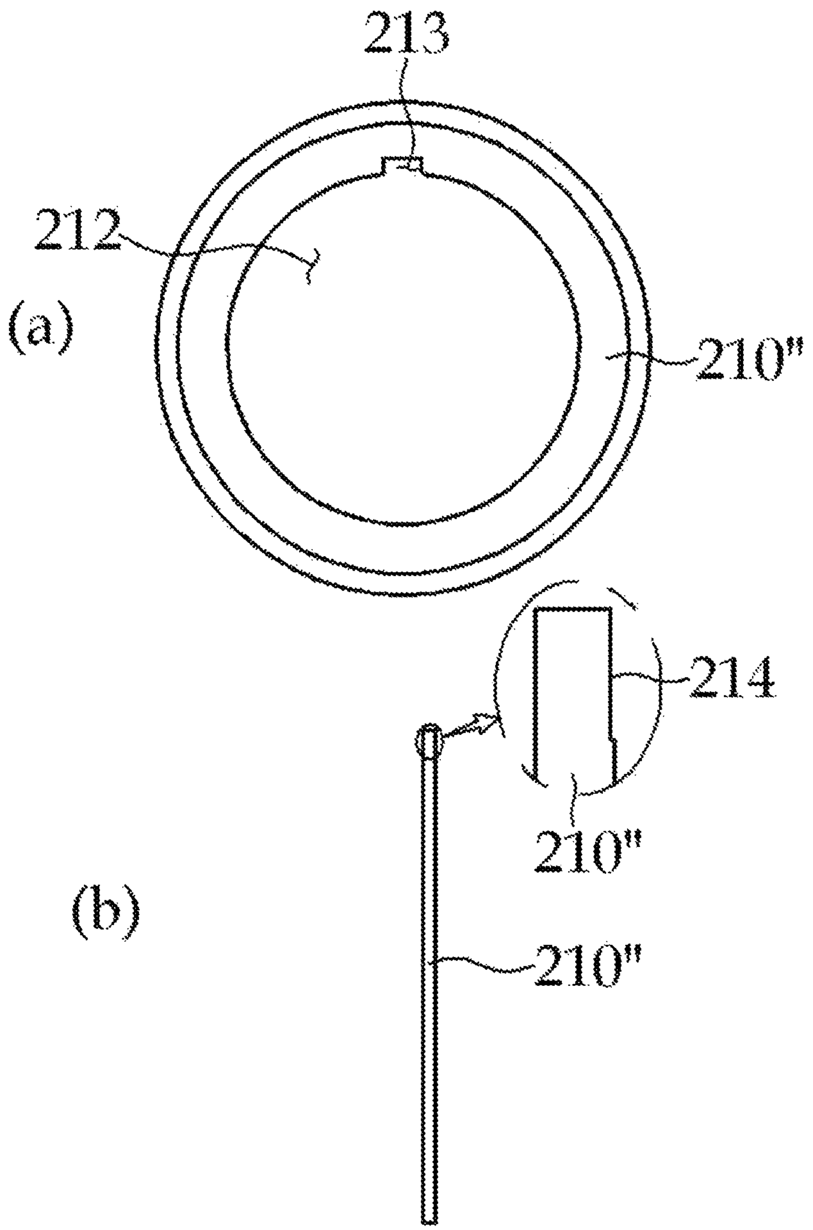
[FIG 5]

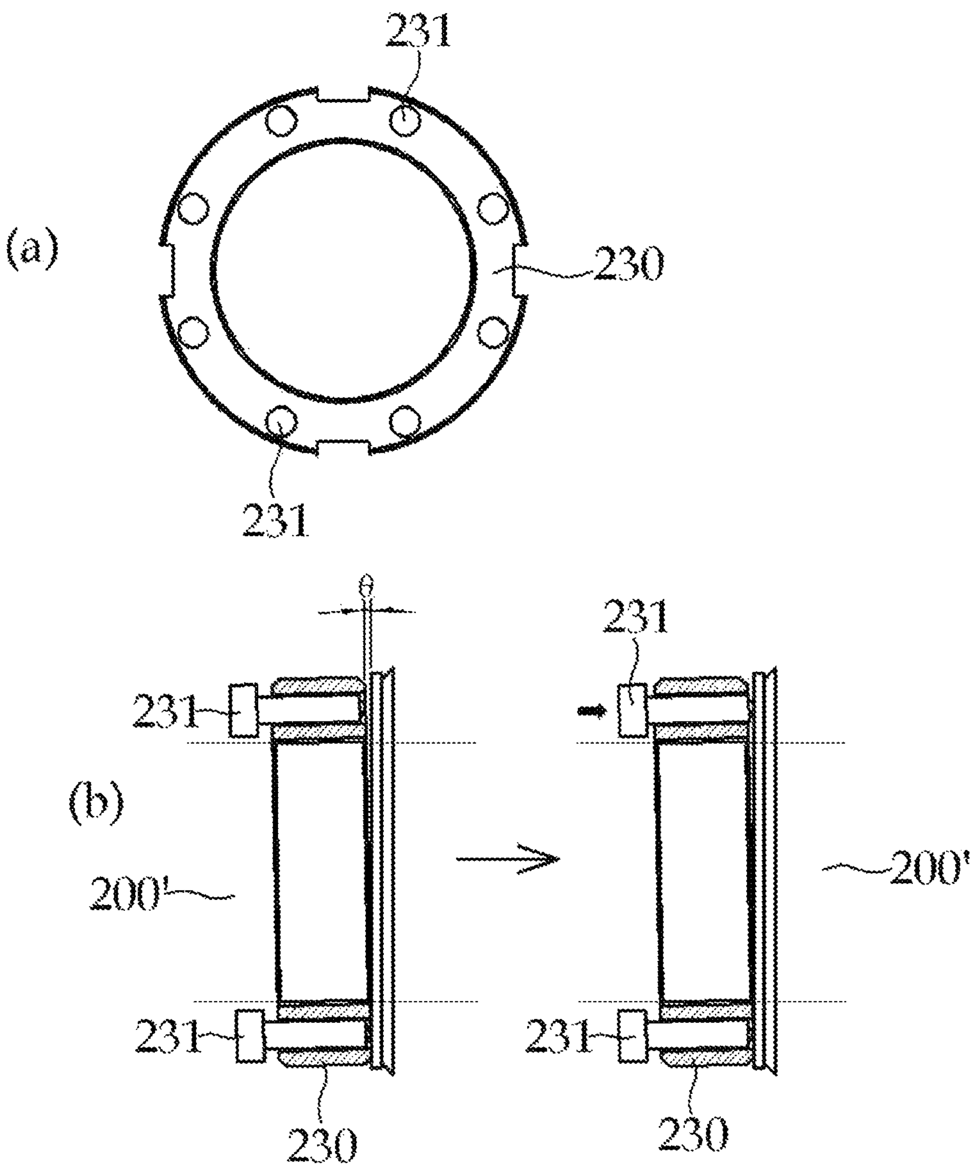
[FIG 6]

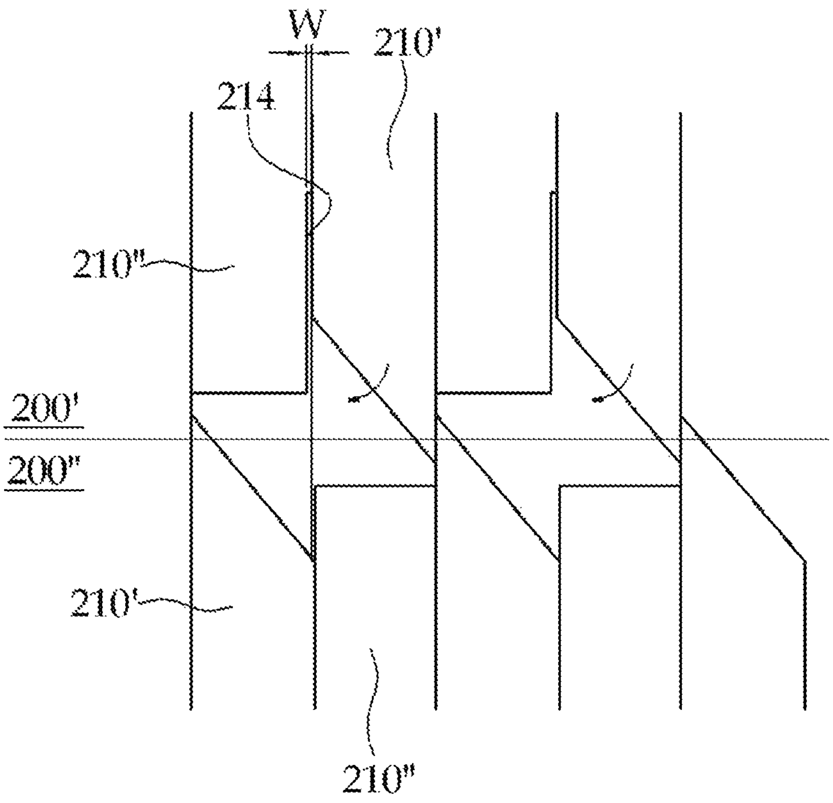
[FIG 7]

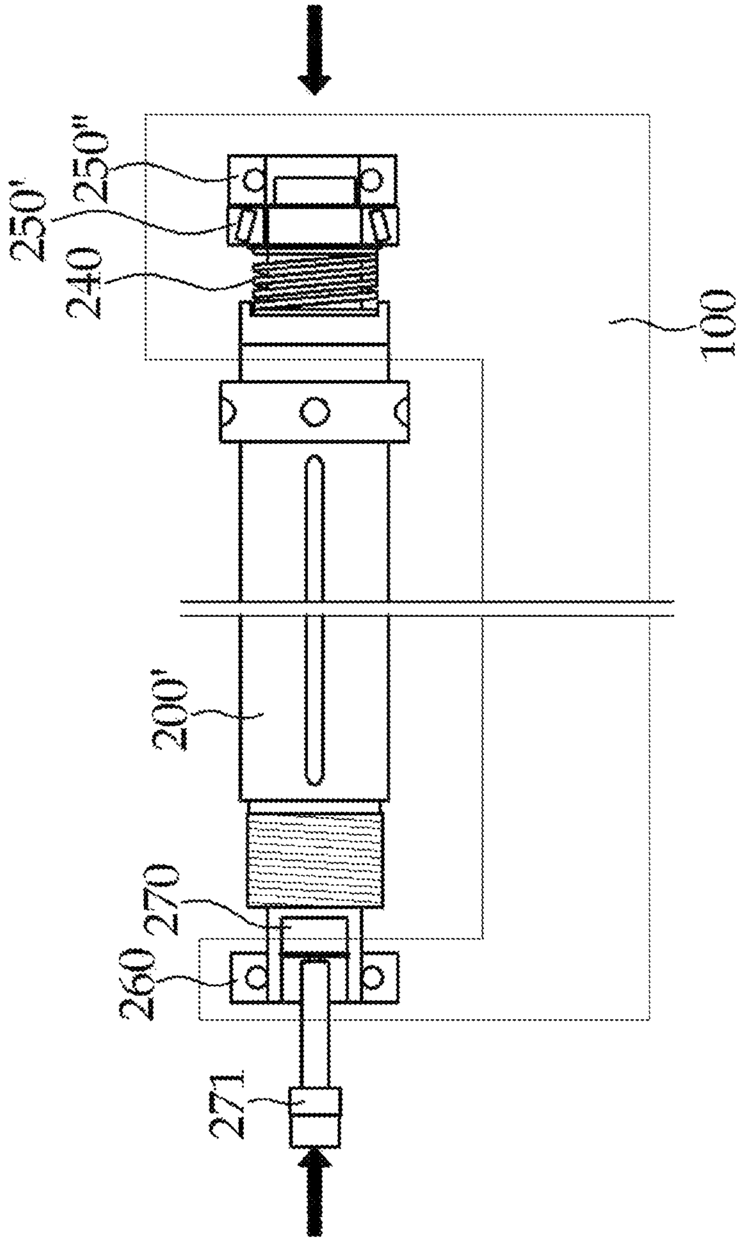
[FIG 8]

STRIP CUTTING DEVICE FOR DIAGNOSTIC KIT

TECHNICAL FIELD

The present invention relates to a strip cutting device for a diagnostic kit that is capable of cutting a band-shaped diagnostic sheet into diagnostic strips with given sizes, and more specifically, to a strip cutting device for a diagnostic kit that is capable of having at least two or more concentricity adjustment screws fastened to an adjustment nut fixedly fitted to one side of a shaft having blades and spacers alternately fitted thereto to cut a diagnostic sheet to given widths, so that through the concentricity adjustment screws, the blades and spacers are pressurized in the direction of the shaft to adjust the concentricity of the blades and spacers, thereby cutting the diagnostic sheet into diagnostic strips with given sizes and protecting the blades to ensure the long term use of the blades. Further, the present invention relates to a strip cutting device for a diagnostic kit that is capable of allowing a first shaft to be adjusted in position in a longitudinal direction thereof, while being elastically supported, thereby accurately adjusting the cutting positions. In addition, the present invention relates to a strip cutting device for a diagnostic kit that is capable of having spacers with projections formed on the peripheries of the surfaces facing cutting edges of blades to provide extra spaces in which the blades move, thereby preventing the deformation of cut strips and the damages on the blades.

BACKGROUND ART

Generally, a diagnostic strip (kit) is made into a band-shaped diagnostic sheet, and the diagnostic sheet is cut by various cutting machines, such as strip cutting devices as disclosed in Patent literature 1 to Patent literature 3.

(Patent Literature 1) Korean Patent No. 10-1617095

Disclosed is a strip cutting device for a diagnostic kit. The conventional device includes a cutter having an upper knife and a lower knife for cutting a diagnostic card, a cutter driver for reciprocating the upper knife in a vertical direction to continuously obtain a first diagnostic strip and a second diagnostic strip from the diagnostic card, a diagnostic card transfer part for step by step moving the diagnostic card to a cutting region between the upper knife and the lower knife, a first vacuum block and a second vacuum block for holding the first diagnostic strip and the second diagnostic strip, respectively, and a diagnostic strip unloading part for moving the first vacuum block and the second vacuum block to an unloading region from the cutting region and expanding a distance between the first vacuum block and the second vacuum block.

(Patent Literature 1) Korean Patent No. 10-1859280

Disclosed is a strip cutting device for a diagnostic kit. The conventional device includes an upper cutting roller having circular upper blades fitted thereto to cut a diagnostic card into a plurality of diagnostic strips, a lower cutting roller having circular lower blades fitted thereto correspondingly to the circular upper blades, a cleaning liquid supply part disposed above the upper cutting roller to supply a cleaning liquid for removing foreign matters from the circular upper blades and the circular lower blades, and a collection container disposed under the lower cutting roller to collect the foreign matters removed from the circular upper blades and the circular lower blades.

(Patent Literature 3) Korean Patent No. 10-2031214

Patent literature 3 relates to a test strip cutting and detecting device for making an in-vitro diagnostic kit. The conventional device includes a supply part for sensing whether an uncut sheet is located in right position by means of a first camera, a circular rotation cutter located behind the supply part to cut the uncut sheet into a plurality of strips, a strip supply part located behind the circular rotation cutter to move the strips, while the strips being open in distance therebetween, and a strip defect discriminator located on the side of the strip supply part to discriminate whether defects occur on the membrane surfaces of the strips, whereby without any interference of a worker, the uncut sheet can be cut into the plurality of strips at once, while it is quickly checked whether the plurality of strips are defective or not, thereby automatically performing the strip making and the detection for the defective strips. In specific, through the simple process of allowing the uncut sheet to enter the supply part, the strip making and the detection for the defective strips can be automatically carried out, and the defect detection is performed by means of a second camera, thereby improving the detecting efficiency and the product performance. In cutting the uncut sheet into the plurality of strips, the strips whose membrane surfaces are defective can be automatically discriminated easily from the strips by means of the strip defect discriminator, so that there is no need to destroy the uncut sheet, thereby decreasing the manufacturing cost and improving the production efficiency.

However, the existing cutting methods where the diagnostic sheet is inserted between the two rollers and is cut into the plurality of strips have the following problems.

Firstly, a plurality of blades has to be fitted to the rollers, respectively, so as to cut the band-shaped diagnostic sheet into the plurality of strips at once in a transverse direction. Accordingly, it is hard to provide the plurality of blades formed unitarily on each roller, and the blades formed unitarily on the rollers may be easily broken. If any one of the blades is damaged or broken, defects may occur, so that the roller itself has to be exchanged with new one, thereby causing short term use and high maintenance cost.

Secondly, a method for solving the above-mentioned problems is proposed by locating the blades separably from the roller, so that the blades and spacers are alternately fitted to the roller and fixed by means of a nut. However, the method has the following problems.

Thirdly, in the case where the spacers and the blades fitted to the roller are fixed to the nut fastened to the roller, even though the nut is sophisticatedly made and fastened to the roller, it slantly pressurizes the spacers and the blades, thereby causing the blades from escaping from their concentric position.

Fourthly, the blades rotate bended so that when the diagnostic sheet is cut into the strips, the distances between the strips are not constant or are made twistedly, thereby causing defective strips.

Fifthly, the adjustment nut may be loosely fastened to allow the blades and the spacers to be loosely fastened to the roller, but in this case, given distances cannot be maintained between the blades and the spacers, thereby failing to cut the diagnostic sheet by means of the blades in right position or causing the cut strips to be caught between the blades and the spacers.

Lastly, if the adjustment nut is tightly fastened, the peripheries of the blades rotating on both sides with respect to the diagnostic sheet are bent in the opposite direction to the fastened direction of the adjustment nut, so that the cutting positions are misaligned to cause the failure in cutting the diagnostic sheet, and further, the blades facing each other come into contact with each other to cause their breakage.

DISCLOSURE

Technical Problem

Accordingly, the present invention has been made in view of the above-mentioned problems occurring in the related art, and it is an object of the present invention to provide a strip cutting device for a diagnostic kit that is capable of having at least two or more concentricity adjustment screws fastened to an adjustment nut fastened to each of first and second shafts to fix a plurality of blades and spacers alternately fitted to each shaft, so that in a state where the blades and spacers are fixed by means of the adjustment nut, the blades and spacers are pressurized in parallel direction to each shaft by means of the concentricity adjustment screws to ensure the concentricity of the blades and spacers, thereby cutting a diagnostic sheet to given widths and protecting the blades to ensure the long term use of the blades.

It is another object of the present invention to provide a strip cutting device for a diagnostic kit that is capable of allowing one side shaft with respect to a diagnostic sheet to be adjusted in position in a longitudinal direction thereof, while being elastically supported, so that the distances from blades of the other shaft can be adjusted, thereby more accurately cutting the diagnostic sheet, without occurrence of any defect, and protecting the blades through shock absorption.

It is yet another object of the present invention to provide a strip cutting device for a diagnostic kit that is capable of having spacers with projections formed on the peripheries of the surfaces facing the cutting edges of blades to provide extra spaces where the blades move, thereby preventing the deformation of cut strips and the damages on the blades.

Technical Solution

To accomplish the above-mentioned objects, according to the present invention, there is provided a strip cutting device for a diagnostic kit, which is adapted to cut a diagnostic sheet 10 provided to a shape of a long plate into a plurality of strips 11 in a transverse direction at once, comprising: a frame 100; a first shaft 200' having a plurality of disc-shaped blades 210' and spacers 210" alternately fixedly fitted thereto, without rotating, and an adjustment nut 230 fastenedly fixed to one side thereof to fix the blades 210' and the spacers 210" thereto, and a second shaft 200" having a plurality of disc-shaped blades 210' and spacers 210" alternately fixedly fitted thereto, without rotating, and an adjustment nut 230 fastenedly fixed to one side thereof to fix the blades 210' and the spacers 210" thereto, wherein as the first shaft 200' and the second shaft 200" are mounted on the frame 100 to rotate in position together, the blades 210" cut the diagnostic sheet (10) into the plurality of strips (11) by means of the shear forces thereof, the first shaft 200' and the second shaft 200" each having at least two or more concentricity adjustment screws 231 fastened on an imaginary circle with respect to the center thereof to each adjustment nut 230 fastenedly fixed thereto to pressurize the blades 210' and the spacers 210" in a transverse direction and thus to adjust the concentricity of the blades 210' and the spacers 210".

Further, the spacers 210" fitted to the first shaft 200' and the second shaft 200" each has a projection 214 with a given distance W formed on the surface facing the surface of each blade 210' where a cutting edge is formed. In this case, the given distance W is in the range of 0.05 to 2 mm.

Desirably, the first shaft 200' has a compression bearing 240, a taper bearing 250', and a bearing 250" sequentially fitted to one side thereof to support the rotation thereof and to absorb the force applied axially thereto and a bearing 260 and a thrust bearing 270 fitted to the other side thereof, the bearing 260 being adapted to support the rotation of the first shaft 200' and the movement in the longitudinal direction of the first shaft 200', and when a length adjustment screw 271 fitted to the frame 100 rotates in position, the thrush bearing 270 being adapted to support the rotation of the first shaft 200'.

Advantageous Effects

According to the present invention, the strip cutting device for a diagnostic kit has the following advantages.

Firstly, the strip cutting device for a diagnostic kit according to the present invention is configured to have the concentricity adjustment screws fastened to the adjustment nut fastened to each of the first and second shafts to fix the plurality of blades and spacers alternately fitted to each shaft, so that in the state where the blades and spacers are fixed by means of the adjustment nut, even though the blades and spacers are not concentric, their concentricity can be obtained easily and accurately through the concentricity adjustment screws.

Secondly, the concentricity is obtained through screw adjustment, and accordingly, rotation quantity is converted into linear movement to thus perform the concentricity adjustment, thereby making it possible that the concentricity can be accurately adjusted even to the unit of 0.01 mm.

Thirdly, the first shaft is adjustable in the longitudinal direction thereof, while being elastically supported in the longitudinal direction thereof, and accordingly, the distances between the blades fitted to the first shaft and the blades fitted to the second shaft are adjusted, thereby cutting the diagnostic sheet at a given position and obtaining gap effects through the elastic movements to cut the diagnostic sheet more safely and conveniently.

Lastly, the first shaft is adjustable by means of screw fastening in the longitudinal direction thereof so that it can be adjusted even to the unit of 0.01 mm.

BRIEF DESCRIPTION OF DRAWINGS

FIG. 1 is a side view showing a state where a diagnostic sheet is put in a strip cutting device for a diagnostic kit according to a first embodiment of the present invention and thus cut into strips.

FIG. 2 is a front view showing the strip cutting device for a diagnostic kit according to the first embodiment of the present invention.

FIG. 3 is an exploded side view showing a configuration of a first shaft of the strip cutting device for a diagnostic kit according to the first embodiment of the present invention.

FIGS. *4a* and *4b* are front and side views showing a blade of the strip cutting device for a diagnostic kit according to the first embodiment of the present invention.

FIGS. *5a* and *5b* are front and side views showing a spacer of the strip cutting device for a diagnostic kit according to the first embodiment of the present invention.

FIGS. *6a* and *6b* are views showing an adjustment nut of the strip cutting device for a diagnostic kit according to the first embodiment of the present invention, wherein FIG. *6a* is a front view of the adjustment nut, and FIG. 6*b* shows a state where concentricity is held by the adjustment nut.

FIG. 7 is an enlarged view showing portions of spacers and blades in a strip cutting device for a diagnostic kit according to a second embodiment of the present invention, wherein projections formed on the spacers are shown.

FIG. 8 is a front view showing a configuration of a first shaft in a strip cutting device for a diagnostic kit according to a third embodiment of the present invention.

BEST MODE FOR INVENTION

Hereinafter, embodiments of the present invention are disclosed in detail with reference to the attached drawings. All terms used herein, including technical or scientific terms, unless otherwise defined, have the same meanings which are typically understood by those having ordinary skill in the art. The terms, such as ones defined in common dictionaries, should be interpreted as having the same meanings as terms in the context of pertinent technology, and should not be interpreted as having ideal or excessively formal meanings unless clearly defined in the specification.

Before the present invention is disclosed and described, it is to be understood that the disclosed embodiments are merely exemplary of the invention, which can be embodied in various forms. However, this does not limit the invention within specific embodiments and it should be understood that the invention covers all the modifications, equivalents, and replacements within the idea and technical scope of the invention.

MODE FOR INVENTION

First Embodiment of the Invention

As shown FIGS. 1 to 6*b*, a strip cutting device for a diagnostic kit according to a first embodiment of the present invention, which is adapted to cut a diagnostic sheet 10 provided to a shape of a long plate into a plurality of strips 11 in a transverse direction at once, includes a frame 100, a first shaft 200', and a second shaft 200".

In specific, the first shaft 200' includes a plurality of blades 210' and spacers 210" alternately fitted thereto, an adjustment nut 230 for fixing the blades 210' and the spacers 210" thereto, and at least two or more concentricity adjustment screws 231 fastened to the adjustment nut 230, and when the adjustment nut 230 does not pressurize the blades 210' and the spacers 210" uniformly, accordingly, the blades 210' and the spacers 210" are pressurized by means of the concentricity adjustment screws 231 to ensure concentricity thereof.

Hereinafter, the components of the strip cutting device according to the first embodiment of the present invention will be explained in detail with reference to the attached drawings. A reference numeral "10" represents the diagnostic sheet provided to the shape of a band and having reagents on one side thereof, and a reference numeral "11" represents each strip made by cutting the diagnostic sheet at once.

A. Frame

As shown in FIGS. 1 and 2, the frame 100 supports both ends of the first shaft 200' and the second shaft 200" as will be discussed later and puts the diagnostic sheet 10 between the first shaft 200' and the second shaft 200" so that the diagnostic sheet 10 can be cut into the plurality of strips 11. Like this, only if the frame 100 serves to support both ends of the first shaft 200' and the second shaft 200", it may be made to any shape, and in the drawings, the frame 100 is made to a lattice shape.

B. First Shaft and Second Shaft

As shown in FIGS. 1 to 3, both ends of the first shaft 200' and the second shaft 200" are fitted to the frame 100 so that the first shaft 200' and the second shaft 200" can rotate in position, and the outer peripheral surfaces thereof are configured to cut the single diagnostic sheet 10 into the plurality of strips 11.

In this case, the first shaft 200' and the second shaft 200" have the same configuration as each other, and accordingly, an explanation of the first shaft 200' will be given for the convenience of the description, while a detailed explanation of the second shaft 200" being avoided. Further, the first shaft 200' and the second shaft 200" rotate in position, respectively, but desirably, gears 220 are fitted to the first shaft 200' and the second shaft 200" and interlock with each other so that the first shaft 200' and the second shaft 200" rotate simultaneously.

To do this, as shown in FIGS. 1 to 6*b*, the first shaft 200' has bearings 250" and 260 mounted on both ends thereof so that it can supportedly rotate in position. Further, the first shaft 200' has the plurality of blades 210' and spacers 210" alternately fitted to the outer peripheral surface thereof and the adjustment nut 230 fastened thereto to fix the blades 210' and the spacers 210". In this case, the first shaft 200' has key grooves 280 formed thereon to fixedly fit the blades 210' and the spacers 210" thereto so that the blades 210' and the spacers 210" cannot rotate in position.

(a). Blade

As shown in FIGS. 2 to 4, each blade 210' has the shape of a disc. In this case, as shown in FIG. 4, the blade 210' has a cutting edge 211 formed on one side periphery thereof, so that the blades 210' fitted to the first shaft 200' and the second shaft 200" can cut the diagnostic sheet 10 by using shearing forces like scissors.

As shown in FIG. 4, each blade 210' includes a mounting hole 212 formed at the center thereof so that it can be fitted to the first shaft 200', and a key groove 213 formed on one side of the mounting hole 212 to fit a key fitted to the corresponding key groove 280 thereto.

(b). Spacer

As shown in FIGS. 2 and 3, each spacer 210" is fitted to the first shaft 200' to tightly face each blade 210'. In this case, the spacer 210" has the shape of a disc having a smaller diameter than the blade 210', to thus ensure a space in which the blade 210' can cut the diagnostic sheet 10. In the same manner as the blade 210', further, the spacer 210" has to have no rotation with respect to the first shaft 200', and accordingly, the spacer 210" includes a mounting hole 212 and a key groove 213 formed thereon. They have been explained above, and a detailed explanation of them will be avoided.

(c). Adjustment Nut

As shown in FIGS. 2, 3, 6*a* and 6*b*, the adjustment nut 230 is fastened to one side of the first shaft 200', desirably, to the first shaft 200' in a state where the blades 210' and the spacers 210" are fitted to the first shaft 200', to fixedly support the blades 210' and the spacers 210" thereto so that the blades 210' and the spacers 210" can be alignedly positioned with one another.

In specific, the adjustment nut 230 has at least two or more concentricity adjustment screws 231 adapted to pressurize the blades 210' and the spacers 210". As the adjustment nut 230 is fastened to the first shaft 200', as shown in FIG. 6*b*, an angle θ caused by a gap may be made according to characteristics of the nut, and accordingly, even though the adjustment nut 230 is firmly fastened to the first shaft 200', it is possible that the blades 210' and the spacers 210" may escape from the concentricity thereof. If the blades 210' and the spacers 210" are not concentric, gaps may be produced to cause the blades 210' and the spacers 210" to move freely, thereby failing to uniformly cut the diagnostic sheet 10 or causing the cut strips 11 to be caught between the blades 210' and the spacers 210" so that defects may occur. According to the present invention, therefore, even though the adjustment nut 230 tightly comes into contact with the blades 210' and the spacers 210", it can be tightly brought into contact with the blades 210' and the spacers 210" by means of the concentricity adjustment screws 231, while maintaining the concentricity of the blades 210' and the spacers 210", so that the diagnosis sheet 10 can be cut into the strips 11 with the given sizes and the cut strips 11 can be prevented from being caught to the gaps between the blades 210' and the spacers 210" to thus cause no defects.

According to the present invention, desirably, at least two or more concentricity adjustment screws 231 are provided so that a constant distance between the neighboring screws 231 is made. Most desirably, eight concentricity adjustment screws 231 are provided so that a constant distance between the neighboring screws 231 is made. When the adjustment nut 230 is rotatingly adjusted, it cannot be recognized whether the angle θ caused by a gap is formed on any side of the adjustment nut 230, and accordingly, the distance between the neighboring concentricity adjustment screws 231 is narrow so that the concentricity can be adjusted by means of the concentricity adjustment screws 231 located close to each other.

Like this, after the concentricity has been adjusted through the concentricity adjustment screws 231, the concentricity of the blades 210' is adjustably checked by means of a concentricity gauge, and the like, which will be easily understood to a person having ordinary skill in the art.

In this case, a reference numeral "290" not explained yet represents a distance adjustment spacer fitted to each of the first shaft 200' and the second shaft 200", which is fitted if it is desired to adjust the number of the blades 210' and the spacers 210" fitted to each shaft or their position in accordance with the length of the diagnostic sheet 10.

Second Embodiment of the Invention

As shown FIG. 7, a strip cutting device for a diagnostic kit according to a second embodiment of the present invention has the same configuration as according to the first embodiment of the present invention, but it is different from that according to the first embodiment of the present invention in that each spacer 210" fitted to the first shaft 200' has a projection 214 formed thereon. Accordingly, the projection 214 as the added component will be explained below, while detailed explanations of the same components as the first embodiment of the present invention being avoided.

According to the second embodiment of the present invention, as shown in FIG. 7, the projection 214 with a given distance W is formed on one side surface of the disc-shaped spacer 210". In this case, desirably, the projection 214 is formed on the surface of the spacer 210" facing the surface of the blade 210" on which the cutting edge 211 is formed. If the first shaft 200' is excessively pressurized against the adjustment nut 230, the portions close to the first shaft 200' may be deformed in a pressurizing direction, and the peripheral portion on which the cutting edge 211 is formed is bent in the opposite direction to the pressurizing direction. Accordingly, the projection 214 is provided as a space in which the blade 210' may be deformed even though bent, so that the strips 11 cut by the blades 210' can be prevented from being deformed and the damages on the blades 210' can be minimized.

According to the present invention, as shown in FIG. 7, the projection 214 desirably has the given distance W in the range of 0.05 to 2 mm, more desirably has the given distance W of 0.1 mm.

Third Embodiment of the Invention

As shown FIG. 8, a strip cutting device for a diagnostic kit according to a third embodiment of the present invention has the same configuration as according to the first and second embodiments of the present invention, but it is different from that according to the first and second embodiments of the present invention in that the first shaft 200' has components moving therealong in a longitudinal direction thereof. Accordingly, the added components will be explained below, while detailed explanations of the same components as the first and second embodiments of the present invention being avoided.

According to the third embodiment of the present invention, as shown in FIG. 8, the first shaft 200' moves in the longitudinal direction thereof to adjust the distances between the blades 210' fitted thereto and the blades 210' fitted to the second shaft 200" so that the diagnostic sheet 10 can be cut more conveniently.

To do this, as shown in FIG. 8, the first shaft 200' has a taper bearing 250' fitted to on one side thereof so that even though the first shaft 200' moves in the longitudinal direction thereof, the taper bearing 250' stably supports the first shaft 200'. In this case, the taper bearing 250' and the bearing 250" are fitted to the first shaft 200' and firmly supported inside the frame 100, without being pushed backward. In specific, a compression spring 240 is fitted between the first shaft 200' and the taper bearing 250', and if the first shaft 200' is pressurized in the longitudinal direction thereof, the compression spring 240 applies a repulsive force in the opposite direction to the pressurizing direction to perform shock absorption.

Further, as shown in FIG. 8, the first shaft 200' has a thrust bearing 270 supportingly fitted to the other side thereof, and the thrust bearing 270 comes into contact with a length adjustment screw 271 fitted to the frame 100. In this case, the length adjustment screw 271 rotates when length adjustment is needed, that is, when there is a need to adjust the distances between the blades 210' fitted to the first shaft 200' and the blades 210' fitted to the second shaft 200", so that the first shaft 200' moves in the longitudinal direction thereof to push the thrust bearing 270 to allow the distances to be adjusted. In this case, the first shaft 200' is adjusted in length with the shock absorption under the elastic support of the compression spring 240, so that the adjustment of the distances between the blades 210' can be achieved, and even though the blades 210' are misaligned, they can be returned to their original position through the shock absorption of the compression spring 240.

As mentioned above, the strip cutting device according to the third embodiment of the present invention is configured to allow the first shaft to be fitted adjustable in the longitudinal direction, while being elastically supported, so that if it is desired to adjust the positions of the blades, the adjustment can be easily performed to stably cut the diagnostic sheet into the strips, and through the elastic support, further, the shock absorption is generated to accurately cut the diagnostic sheet in position into the given shapes, while protecting the blades.

EXPLANATIONS OF REFERENCE NUMERALS

10: Diagnostic sheet
11; Strip
100: Frame
200': First shaft
200": Second shaft
210': Blade
210": Spacer
214: Projection
230: Adjustment nut
231: Concentricity adjustment screw
250: Compression spring
270: Thrust bearing
271: Length adjustment screw
280: Key groove

The invention claimed is:

1. A strip cutting device for a diagnostic kit, which is adapted to cut a diagnostic sheet (10) provided to the shape of a band into a plurality of strips (11) in a transverse direction at once, the strip cutting device comprising: a frame (100); a first shaft (200') having a plurality of disc-shaped blades (210') and spacers (210") alternately fixedly fitted thereto, without rotating, and an adjustment nut (230) fastenedly fixed to one side thereof to fix the blades (210') and the spacers (210") thereto, and a second shaft (200") having a plurality of disc-shaped blades (210') and spacers (210") alternately fixedly fitted thereto, without rotating, and an adjustment nut (230) fastenedly fixed to one side thereof to fix the blades (210') and the spacers (210") thereto, wherein as the first shaft (200') and the second shaft (200") are mounted on the frame (100) to rotate in position together, the blades (210") cut the diagnostic sheet (10) into the plurality of strips (11) by means of the shear forces thereof, the first shaft (200') and the second shaft (200") each having at least two or more concentricity adjustment screws (231) fastened on an imaginary circle with respect to the center thereof to each adjustment nut (230) fastenedly fixed thereto to pressurize the blades (210') and the spacers (210") in a transverse direction and thus to adjust the concentricity of the blades (210') and the spacers (210"), and the spacers (210") fitted to the first shaft (200') and the second shaft (200") each having a projection (214) with a given distance (W) formed on the surface facing the surface of each blade (210') where a cutting edge is formed.

2. The strip cutting device according to claim 1, wherein the given distance (W) is in the range of 0.05 to 2 mm.

3. The strip cutting device according to claim 1, wherein the first shaft (200') has a compression bearing (240), a taper bearing (250'), and a bearing (250") sequentially fitted to one side thereof to support the rotation thereof and to absorb the force applied axially thereto and a bearing (260) and a thrust bearing (270) fitted to the other side thereof, the bearing (260) being adapted to support the rotation of the first shaft (200') and the movement in the longitudinal direction of the first shaft (200'), and when a length adjustment screw (271) fitted to the frame (100) rotates in position, the thrush bearing (270) being adapted to support the rotation of the first shaft (200').

4. The strip cutting device according to claim 2, wherein the first shaft (200') has a compression bearing (240), a taper bearing (250'), and a bearing (250") sequentially fitted to one side thereof to support the rotation thereof and to absorb the force applied axially thereto and a bearing (260) and a thrust bearing (270) fitted to the other side thereof, the bearing (260) being adapted to support the rotation of the first shaft (200') and the movement in the longitudinal direction of the first shaft (200'), and when a length adjustment screw (271) fitted to the frame (100) rotates in position, the thrush bearing (270) being adapted to support the rotation of the first shaft (200').

* * * * *